(12) United States Patent  
Yamada

(10) Patent No.: US 8,928,294 B2  
(45) Date of Patent: Jan. 6, 2015

(54) STEP-UP SWITCHING POWER SUPPLY

(71) Applicant: Fuji Electric Co., Ltd., Kawasaki-shi (JP)

(72) Inventor: Kouhei Yamada, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 49 days.

(21) Appl. No.: 13/844,091

(22) Filed: Mar. 15, 2013

(65) Prior Publication Data

US 2013/0241512 A1    Sep. 19, 2013

(30) Foreign Application Priority Data

Mar. 15, 2012    (JP) .................................. 2012-058728

(51) Int. Cl.
  *G05F 1/00*    (2006.01)
  *G05F 1/10*    (2006.01)
(52) U.S. Cl.
  CPC ........................ *G05F 1/10* (2013.01)
  USPC ........................................... 323/222; 323/285
(58) Field of Classification Search
  USPC ..................... 323/207, 222, 271, 282–285
  See application file for complete search history.

(56) References Cited

U.S. PATENT DOCUMENTS

| 8,183,839 B2* | 5/2012 | Shimizu et al. ............... 323/207 |
| 2005/0067363 A1 | 3/2005 | Noma et al. |
| 2005/0285585 A1 | 12/2005 | Noma |
| 2007/0145957 A1* | 6/2007 | Wu et al. ...................... 323/222 |
| 2007/0145965 A1 | 6/2007 | Oswald et al. |
| 2011/0157141 A1* | 6/2011 | Woo et al. .................... 345/212 |

FOREIGN PATENT DOCUMENTS

| JP | 2005-110369 A | 4/2005 |
| JP | 2006-014559 A | 1/2006 |
| JP | 2007-159395 A | 6/2007 |
| JP | 2011-199973 A | 10/2011 |
| JP | 2011-205743 A | 10/2011 |

* cited by examiner

*Primary Examiner* — Nguyen Tran  
(74) *Attorney, Agent, or Firm* — Rabin & Berdo, P.C.

(57) ABSTRACT

A hysteresis control step-up switching power supply includes a switching element. Current flowing through the switching element does not continue to increase indefinitely. The switching element is turned off when a detected value of an output voltage increases to a reference voltage, or when the output of a current detector circuit that detects that a current flowing through the switching element increases to a reference current value.

13 Claims, 5 Drawing Sheets

STEP-UP SWITCHING POWER SUPPLY

CROSS-REFERENCE TO RELATED APPLICATION

This application claims the benefit of priority of Japanese patent application number 2012-058728, filed on Mar. 15, 2012 the disclosure of which is incorporated herein by reference.

BACKGROUND OF THE INVENTION

1. Technical Field

The present invention relates to a step-up switching power supply wherein the turning on and off of a switching element is fixed directly from the result of comparing a detected output voltage value and a reference voltage, without using an error amplifier.

2. Related Art

Heretofore known switching power supplies are mainly such that the difference between a detected output voltage value and a reference voltage is amplified by an error amplifier, thereby generating an error signal, and the turning on and off of a switching element is controlled by the error signal. An example of a configuration of a heretofore known step-up switching power supply using an error amplifier is shown in FIG. 4.

The step-up switching power supply shown in FIG. 4 includes voltage divider resistors R1 and R2 (resistance values thereof are also expressed as R1 and R2), an error amplifier ErrAmp, a comparator Comp1, an RS flip-flop FF1, an oscillator circuit OSC, a drive circuit Drv, an inductor L, a switching element Msw formed of an N-channel MOS transistor, a current detector circuit Idet, a rectifying element, which may be a diode D, and an output capacitor Cout. An output voltage Vout is the voltage across the output capacitor Cout, and is divided by the voltage divider resistors R1 and R2, thus providing a detected value (feedback voltage) Vfb of the output voltage Vout. The error amplifier ErrAmp amplifies the difference between the detected value (feedback voltage) Vfb and a reference voltage Vref, and outputs an error signal Ve. The comparator Comp1 compares the error signal Ve and an output voltage Videt of the current detector circuit Idet, which represents the value of the current flowing through the switching element Msw, and resets the RS flip-flop FF1 when the output voltage Videt of the current detector circuit Idet reaches the error signal Ve (when Videt≥Ve). Meanwhile, the oscillator circuit OSC provides a set pulse of a constant cycle to the RS flip-flop FF1. The RS flip-flop FF1, via the drive circuit Drv, controls the turning on and off of the switching element Msw so that the switching element Msw is turned on when the RS flip-flop FF1 is set, and turned off when the RS flip-flop FF1 is reset.

On the switching element Msw being turned on, the inductor L is connected between an input voltage Vin (the high potential side potential of an input power source) and a reference potential GND (the low potential side potential of the input power source), thereby increasing the current flowing through the inductor L. On the switching element Msw being turned off, the current flowing through the inductor L commutates to the diode D, and charges the output capacitor Cout. When the current of the inductor L flows to the diode D, the current flowing through the inductor L decreases. When the switching element Msw is next turned on, the current of the inductor L commutates from the diode D to the switching element Msw.

As an operation of the switching power supply, an operation whereby the current flowing through the inductor L increases, and energy is stored in the inductor L, when the switching element Msw is in an on-state, the switching element Msw is turned off when the current flowing through the switching element Msw reaches a value corresponding to the error signal Ve, and the energy stored in the inductor L is discharged to the output capacitor Cout, is repeated in every cycle of the oscillator circuit OSC, and the output voltage Vout is controlled to the voltage indicated by the reference voltage Vref.

The error amplifier ErrAmp is a functional element for carrying out a negative feedback control whereby the time for which the switching element Msw is in an on-state is shortened by the error signal Ve being lowered when the detected value (divided value) Vfb of the output voltage Vout is higher than the reference voltage Vref, and the time for which the switching element Msw is in an on-state is lengthened by the error signal Ve being raised when Vfb is lower than the reference voltage Vref, and the output voltage Vout is controlled to Vout=Vref×(R1+R2)/R2 by the negative feedback control. Herein, in order that the negative feedback control is carried out stably, it is necessary for phase compensation of the error amplifier ErrAmp to be appropriately carried out.

However, responsiveness deteriorates when phase compensation is carried out for the error amplifier ErrAmp, and there is a problem in that response to a sudden change in the load, or the like, is delayed. Also, as a phase compensation circuit, the oscillator circuit OSC, or the like, is necessary, there is also a problem in that the switching power supply control circuit becomes complex.

In response to this, a control method called hysteresis control or ripple control has been proposed (for example, refer to JP-A-2006-14559, JP-A-2007-159395, and JP-A-2011-205743).

A configuration of a heretofore known switching power supply using hysteresis control is shown in FIG. 5. FIG. 5 is a step-down switching power supply including the voltage divider resistors R1 and R2, comparators Comp2 and Comp3, an RS flip-flop FF2, the oscillator circuit OSC, the drive circuit Drv, the inductor L, the switching element Msw formed of an N-channel MOS transistor, the diode D, and the output capacitor Cout. The output voltage Vout is the voltage across the output capacitor Cout, and is divided by the voltage divider resistors R1 and R2, thus providing the detected value (feedback voltage) Vfb of the output voltage Vout. The comparators Comp2 and Comp3 compare the detected value Vfb of the output voltage Vout with reference voltages Vref10 and Vref20 (Vref10<Vref20) respectively, the comparator Comp2 sets the RS flip-flop FF2 when the detected value Vfb of the output voltage Vout becomes equal to or lower than the reference voltage Vref10, and the comparator Comp3 resets the RS flip-flop FF2 when the detected value Vfb of the output voltage Vout becomes equal to or higher than the reference voltage Vref20. The RS flip-flop FF2, via the drive circuit Drv, controls the turning on and off of the switching element Msw so that the switching element Msw is turned on when the RS flip-flop FF2 is set, and turned off when the RS flip-flop FF2 is reset.

As an operation of the switching power supply, current is supplied from the input voltage Vin to the load via the inductor L when the switching element Msw is in an on-state, and current flowing through the inductor L increases, whereby energy is stored in the inductor L, and on the switching element Msw being turned off, the current flowing through the inductor L commutates, current flows into the inductor L from the reference potential GND (the low potential side potential of the input power supply) rather than from the input voltage Vin, and the current flowing through the inductor L, that is, the energy of the inductor L, decreases. By the heretofore described operation being repeated, the output voltage Vout is controlled to the voltages indicated by the reference voltages Vref10 and Vref20. That is, the output voltage Vout has a ripple waveform that rises and falls between Vref10× (R1+R2)/R2 and Vref20×(R1+R2)/R2 (the name ripple control has its origin here).

As this method does not involve phase compensation, high-speed response is possible, and as no oscillator circuit is necessary either, it is also possible to achieve a simplification of the control circuit.

However, the hysteresis control type switching power supplies disclosed in the patent documents are all step-down types, with no step-up type. It is supposed that this depends on whether or not the timing at which the switching element is turned off can be easily determined. That is, it is because, when considering the output voltage in an on-state period for which the switching element is in an on-state, the step-down switching power supply is such that the input voltage and output terminal are connected via the inductor L, and the output voltage rises, because of which the timing at which the switching element is turned off using the circuit shown in FIG. 5 can be easily determined, whereas a step-up switching power supply is such that the current flowing through the inductor L flows to the switching element Msw and not to the output terminal, because of which the output voltage does not rise, and it is not possible as things stand to determine the timing at which the switching element is turned off.

SUMMARY OF THE INVENTION

The invention has an object of providing a hysteresis control type step-up switching power supply that solves the heretofore described problem.

Therefore, in order to solve the problem, the invention according to a first aspect is a step-up switching power supply connected to an input power source. The step-up switching power supply includes an inductor having a first end connected to a high potential side of the input power source. The step-up switching power supply also includes a switching element connected between a second end of the inductor and a low potential side of the input power source. The step-up switching power supply also comprises a rectifying element connected to the second end of the inductor, and an output terminal connected via the rectifying element to the second end of the inductor. The step-up switching power supply includes an output voltage detector circuit that detects the voltage level of the output terminal and outputs a voltage detector voltage indicative thereof. The step-up switching power supply also includes a current detector circuit that detects the level of current flowing through the switching element and outputs a detected current value indicative of the detected current level. The step-up switching power supply also includes circuit elements that receive a reference current signal, a first reference voltage, a second reference voltage, the voltage detector voltage and the detected current value. The second reference voltage has a voltage level that is higher than a voltage level of the first reference voltage. The circuit elements control the switching element to be in an off-state in response to the level of voltage detector voltage increasing to be equal to the level of the second reference voltage, or the detected current increasing to a value of the reference current signal. The circuit elements further control the switching element to be in an on-state in response to the voltage detector voltage level decreasing to the level of the first reference voltage and the detected current value decreasing to less than the value of the reference current signal.

The invention according to a second aspect is the step-up switching power supply according to the first aspect, wherein the off-state of the switching element is continued for a predetermined time after current detected by the current detector circuit increases to the reference current value.

The invention according to a third aspect is the step-up switching power supply according to the second aspect, wherein the predetermined time varies in accordance with the difference between the voltages of the high potential side of the input power source and the output terminal.

The invention according to a fourth aspect is the step-up switching power supply according to any one of the first to third aspects, wherein the current detector circuit converts the current flowing through the switching element to a voltage signal using a resistor or transformer, the voltage signal forms the output of the current detector circuit, and the reference current signal is a voltage signal corresponding to the reference current.

The invention according to a fifth aspect is the step-up switching power supply according to any one of the first to fourth aspects, wherein a comparison of the voltage detector voltage output by the output voltage detector circuit and the first reference voltage and second reference voltage is carried out by a hysteresis comparator.

As the step-up switching power supply of the invention is such that the switching element is turned off upon the level of the detector voltage output by the output voltage detector circuit increasing to the second reference voltage level, or upon the detected level of current flowing through the switching element increasing to the value of the reference current signal, it is possible to provide a hysteresis control type step-up switching power supply.

DETAILED DESCRIPTION OF THE EMBODIMENTS

Figure 1:
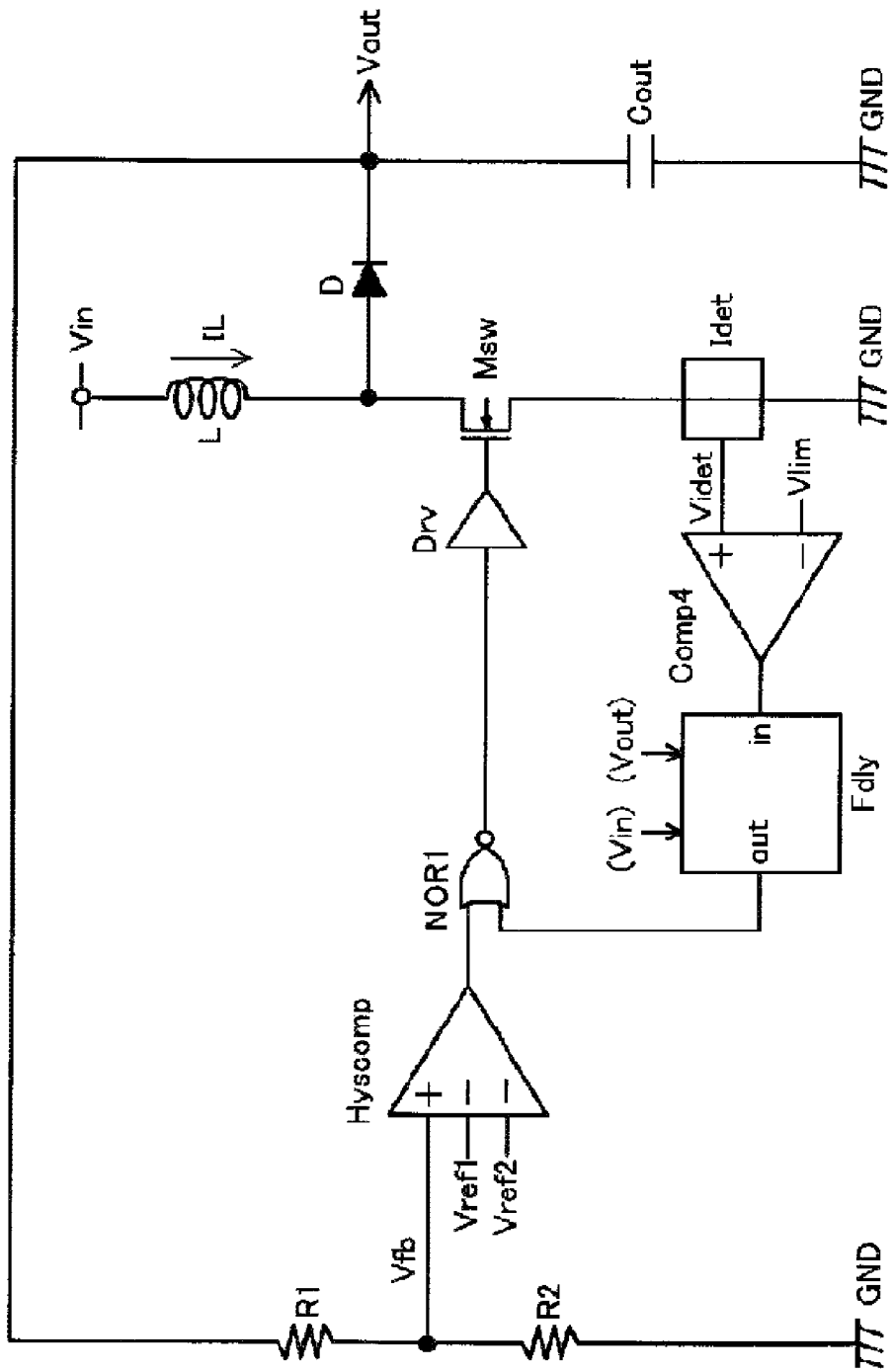
FIG. 1 is a diagram showing an example of a configuration of a hysteresis control type step-up switching power supply according to the invention.

Hereafter, a detailed description will be given, referring to the drawings, of an embodiment of the invention.

Figure 4:
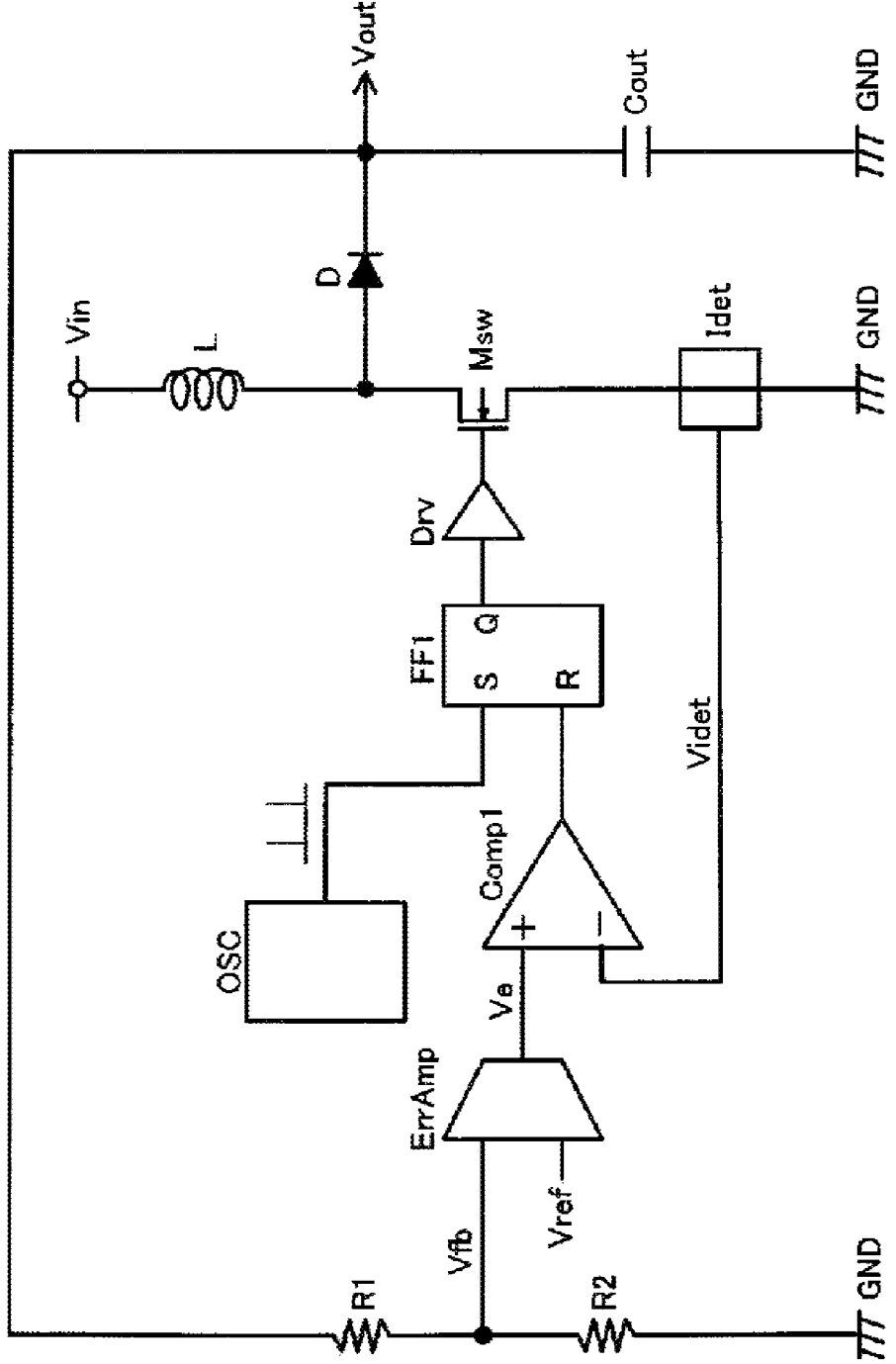
FIG. 4 is a diagram for illustrating a configuration of a heretofore known step-down switching power supply.
Figure 5:
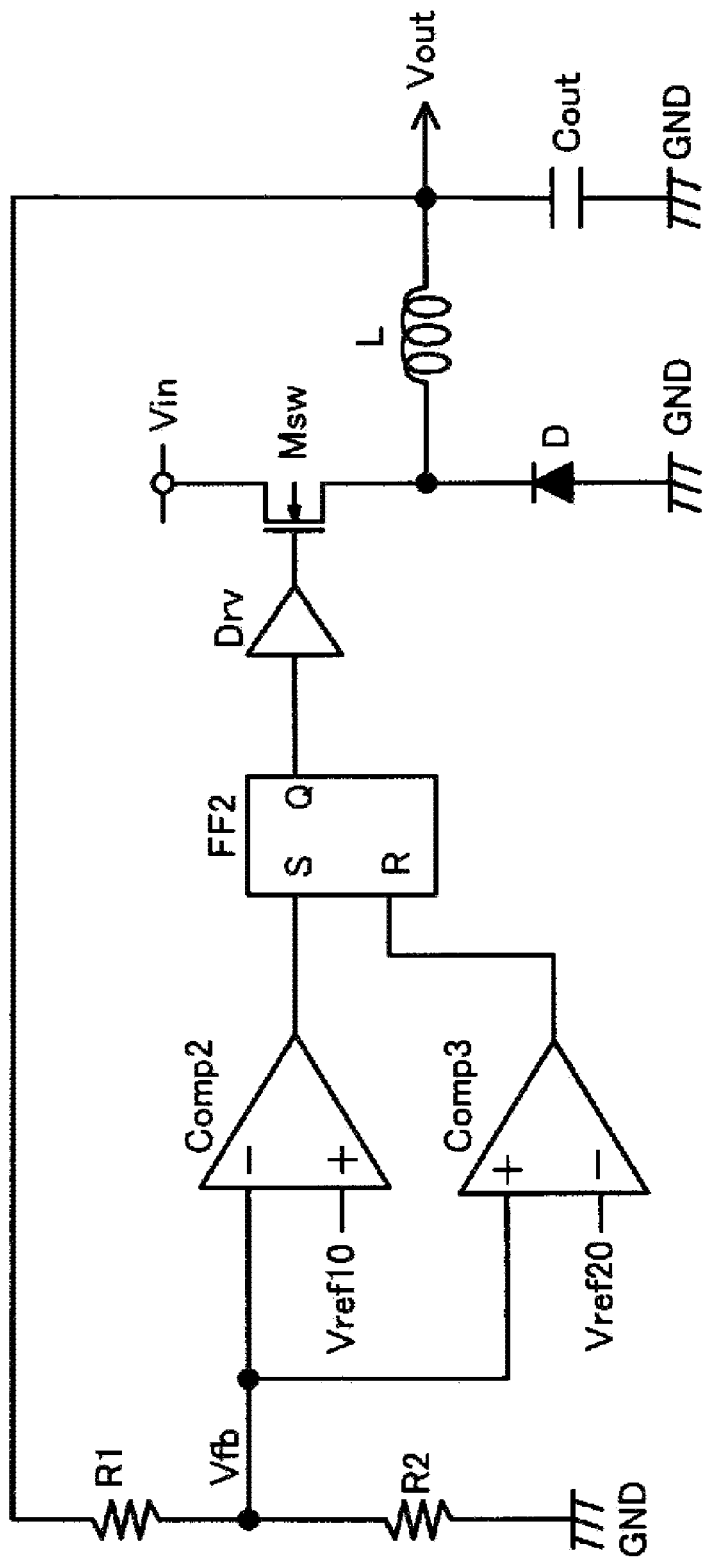
FIG. 5 is a diagram for illustrating a configuration of a heretofore known hysteresis control type step-down switching power supply.

FIG. 1 shows an embodiment of a step-up switching power supply according to the invention. The same reference signs are given to regions the same as in FIG. 4, and a detailed description thereof is omitted.

The step-up switching power supply shown in FIG. 1 includes voltage divider resistors R1 and R2, a hysteresis comparator Hyscomp, a NOR gate NOR1, a drive circuit Drv, an inductor L, a switching element Msw formed of an N-channel MOS transistor, a current detector circuit Idet, a comparator Comp4, a delay circuit Fdly, a diode D, and an output capacitor Cout. The NOR gate NOR1, the drive circuit Drv, the comparator Comp4 and delay circuit Fdly may constitute circuit elements for controlling whether the switching element Msw is in an "on-state" or an "off-state." A connection point of the diode D and output capacitor Cout corresponds to an output terminal. A voltage divider circuit formed of the voltage divider resistors R1 and R2 configures an output voltage detector circuit that detects a voltage Vout of the output terminal. The current detector circuit Idet can be configured of a resistor or current transformer, or of an auxiliary winding, or the like, when configuring the step-up switching power supply using an insulating method that uses a transformer. The output voltage Vout is the voltage across the output capacitor Cout, and is divided by the voltage divider resistors R1 and R2, thus providing a detected value (feedback voltage) Vfb of the output voltage Vout. The hysteresis comparator Hyscomp compares the detected value (feedback voltage) Vfb and reference voltages Vref1 and Vref2 (Vref1<Vref2), outputs at a high (H) level when Vref2≤Vfb, and outputs at a low (L) level when Vref1≥Vfb. The hysteresis comparator Hyscomp changes from an H level to an L level or vice-versa as the feedback voltage Vfb changes, and otherwise stays the same. Thus, when the feedback voltage Vfb is between Vref1 and Vref2, the hysteresis comparator Hyscomp maintains its output at the same level (whether that was H level or L level) as it did immediately prior to the feedback voltage Vfb changing to be between Vref1 and Vref2. The output of the hysteresis comparator Hyscomp is connected to one input terminal of the NOR gate NOR1, while the output of the delay circuit Fdly is connected to the other input terminal. The output of the NOR gate NOR1 is amplified by the drive circuit Dry, and connected to the gate terminal of the switching element Msw. Because of this configuration, the turning on and off of the switching element Msw is controlled so that the switching element Msw is turned on when the output of the NOR gate NOR1 is at an H level, and turned off when the output of the NOR gate NOR1 is at an L level.

The current detector circuit Idet is a current detector circuit that detects the current flowing through the switching element Msw and outputs a signal Videt that represents the size of the current, and can be configured of, for example, a resistor or transformer. The comparator Comp4 compares the output signal Videt of the current detector circuit Idet and a reference current signal Vlim. The reference current signal Vlim is a voltage signal corresponding to an allowed value (a value of the flowing current that will cause the switching element Msw to be turned off) ILlim of the current flowing through the switching element Msw. The output of the comparator Comp4 is input to the delay circuit Fdly. The delay circuit Fdly is a circuit that imparts a delay (for a predetermined amount of time greater than zero) to a falling input, then outputs it as its own output, and outputs a rising input as its own output without imparting any delay.

Next, a description will be given of an operation of the step-up switching power supply. When the detected value Vfb of the output voltage Vout becomes Vfb=Vout×R2/(R1+R2), and Vref2≤Vfb, as heretofore described, that is, when Vref2×(R1+R2)/R2≤Vout, the output of the hysteresis comparator Hyscomp changes to an H level, because of which the output of the NOR gate NOR1 changes to an L level, and the switching element Msw is turned off (cut off).

Meanwhile, when Vref1≥Vfb, as heretofore described, that is, when Vref1×(R1+R2)/R2≥Vout, the output of the hysteresis comparator Hyscomp changes to an L level, because of which the output of the NOR gate NOR1 changes to an H level, and the switching element Msw is turned on (continuous). Also, even when Vref2≥Vfb, the output of the comparator Comp4 changes to an H level when Videt≥Vlim, that is, when the current flowing through the switching element Msw reaches the current ILlim corresponding to the reference current signal Vlim, and this H level signal is immediately transmitted to the NOR gate NOR1 without being delayed by the delay circuit Fdly, because of which the output of the NOR gate NOR1 changes to an L level, and the switching element Msw is turned off (cut off). On the switching element Msw being turned off, Videt becomes zero, and the output of the comparator Comp4 falls from an H level to an L level. As heretofore described, this fall is delayed by a predetermined period by the delay circuit Fdly, then transmitted to the NOR gate NOR1. On the delayed L level signal being transmitted to the NOR gate NOR1, the output of the NOR gate NOR1 changes to an H level, and the switching element Msw is turned on. That is, when the condition whereby Videt Vlim is satisfied, the switching element Msw is turned off for a predetermined period fixed by the delay circuit Fdly.

Figure 2:
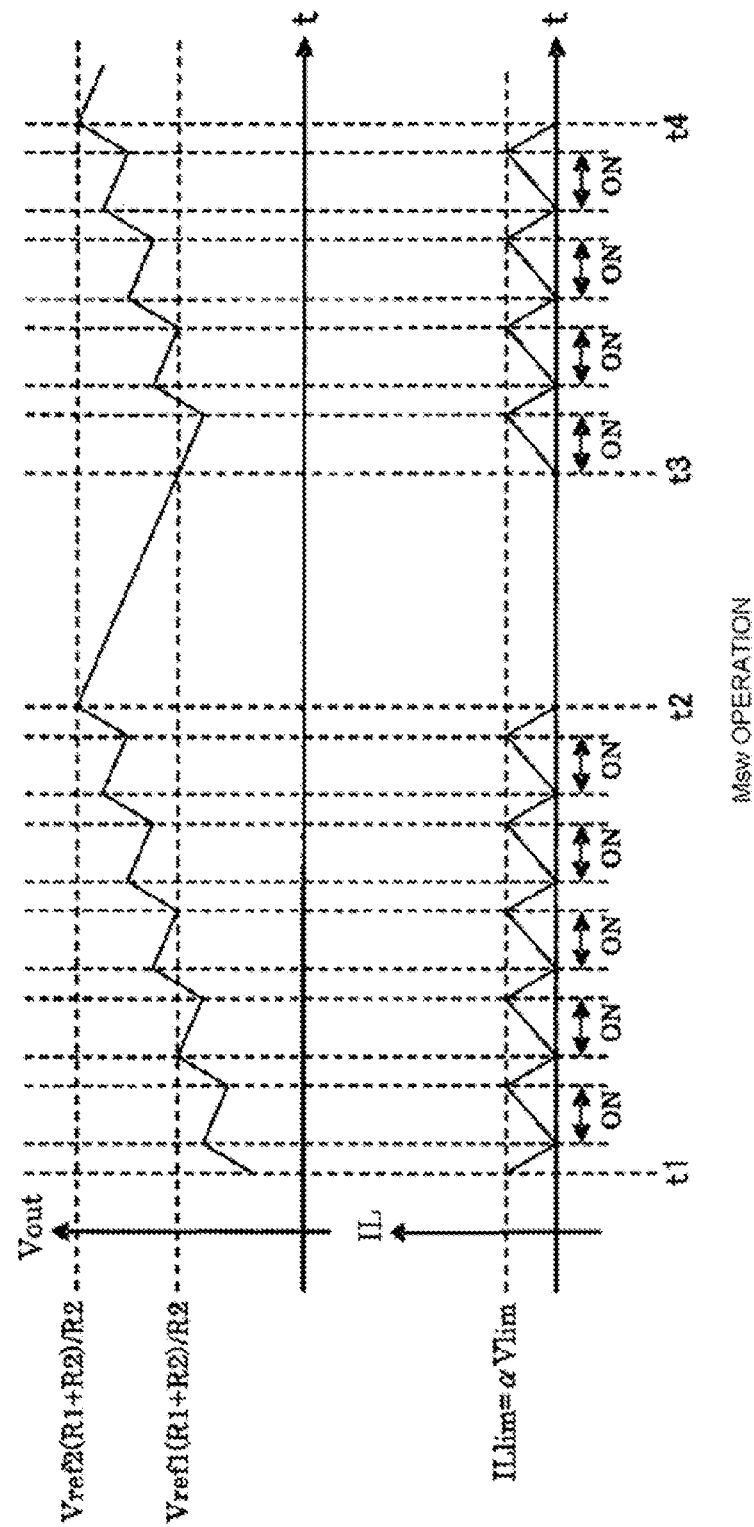
FIG. 2 is timing charts for illustrating an operation of the hysteresis control type step-up switching power supply shown in FIG. 1.

FIG. 2 shows timing charts for illustrating the operation of the step-up switching power supply. The diagram on the upper side of FIG. 2 is a timing chart relating to the output voltage Vout of the step-up switching power supply, while the diagram on the lower side is a timing chart relating to a current IL flowing through the inductor L. The horizontal axes are both a time t. Also, α in the drawing is a conversion coefficient indicating the relationship between IL, which is the input of the current detector circuit Idet, and the output voltage Videt, wherein IL=αVidet. Further, ILlim is a current value corresponding to the reference current signal Vlim.

In FIG. 2, a period for which t1≤t<t2 is a period for which Vref2>Vfb, that is, Vref2×(R1+R2)/R2>Vout. As Vref2>Vfb, the output of the hysteresis comparator Hyscomp is at an L level, and the output of the NOR gate NOR1, that is, the turning on and off of the switching element Msw, is determined by the output of the delay circuit Fdly. In this period, the output of the delay circuit Fdly immediately changes to an H level on the current IL reaching ILlim (on the voltage Videt reaching Vlim), and the switching element Msw is turned off. Then, on a delay time fixed by the delay circuit Fdly elapsing, the output of the delay circuit Fdly changes to an L level, and the switching element Msw is turned on again. Herein, the delay time fixed by the delay circuit Fdly is set at a length of time needed for the current IL that has reached ILlim to reach zero, so that the step-up switching power supply performs critical operations.

On the switching element Msw being turned on, the supply of current from the inductor L to the output capacitor Cout stops, and a load current flows from the output capacitor Cout to an unshown load, because of which the output voltage Vout drops, and on the switching element Msw being turned off, current is supplied from the inductor L to the output capacitor Cout, because of which the output voltage Vout rises.

On the voltage Vfb reaching the reference voltage Vref2 at a time t2, the output of the hysteresis comparator Hyscomp changes to an H level, as heretofore described, because of which the output of the NOR gate NOR1 changes to an L level, and the switching element Msw is turned off. When the output of the hysteresis comparator Hyscomp is at an H level, the switching element Msw is in an off-state regardless of the output of the delay circuit Fdly, and this state continues until the voltage Vfb reaches the reference voltage Vref1.

On the voltage Vfb reaching the reference voltage Vref1 at a time t3, the output of the hysteresis comparator Hyscomp changes to an L level, as heretofore described, because of which the output of the NOR gate NOR1 changes to an H level, and the switching element Msw is turned on. A subsequent operation until a time t4 is the same as the operation in the period for which t1≤t<t2.

The timing charts shown in FIG. 2 show an example of a case in which the turning on and off of the switching element Msw is mainly determined by the delay circuit Fdly, but this is not limiting. By reducing the difference between the reference voltages Vref1 and Vref2 or increasing the reference current signal Vlim with respect to those in FIG. 2, the turning on and off of the switching element Msw will be mainly fixed by the hysteresis comparator Hyscomp.

In order to simplify the configuration, the delay time fixed by the delay circuit Fdly may be a constant time unrelated to the input voltage Vin or output voltage Vout, but by varying the delay time in accordance with the input voltage Vin or output voltage Vout so that the current IL that has reached ILlim is constantly zero after the delay time has elapsed, it is possible to cause the switching element Msw to be turned on with zero-current switching. This is because a change rate $dIL/dt$ of the current IL when the switching element Msw is in an off-state is $dIL/dt=(Vin-Vout)/L$, the time needed until a current that has reached ILlim reaches zero is $ILlim\times L/(Vout-Vin)$, and both fluctuate in accordance with the input voltage Vin or output voltage Vout. Also, the delay time of the delay circuit Fdly may be varied in accordance with the input voltage Vin or output voltage Vout when using in a wide range of the input voltage Vin or output voltage Vout, even when not aiming for critical operations. An example of a configuration of the delay circuit Fdly that realizes this is shown in FIG. 3.

Figure 3:
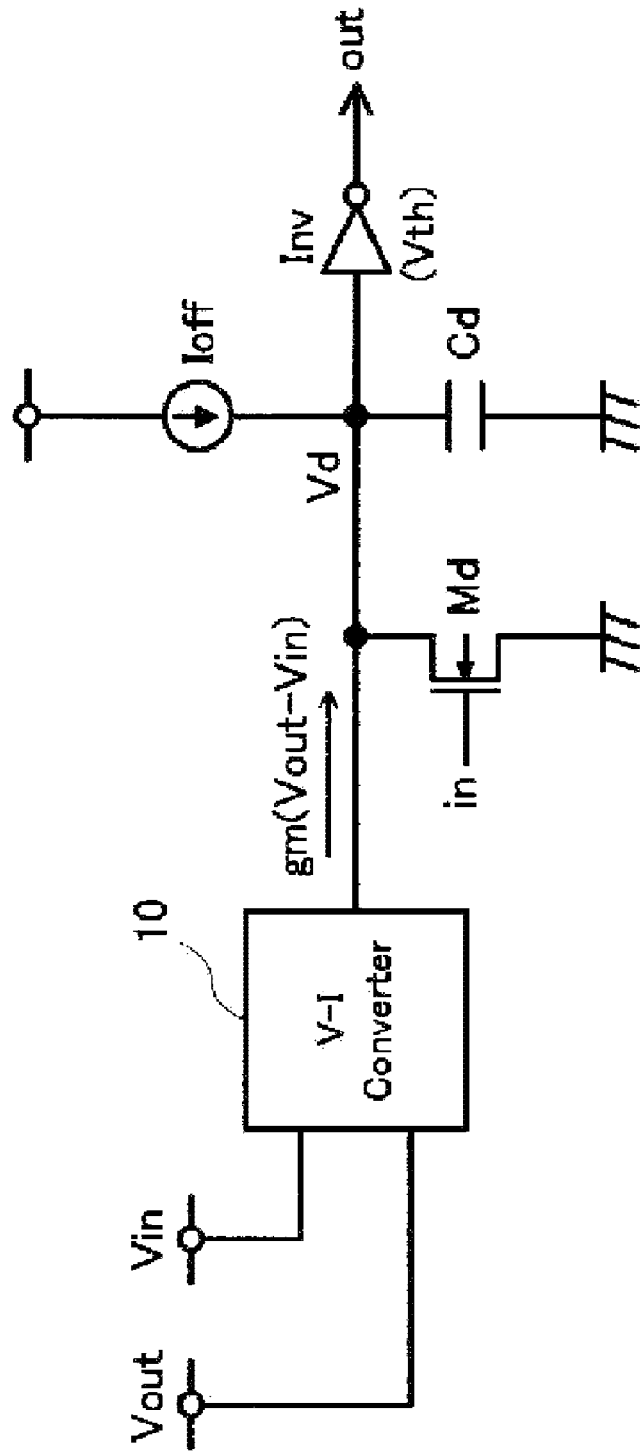
FIG. 3 is a diagram showing an example of a configuration of a delay circuit.

The delay circuit Fdly shown in FIG. 3 includes a voltage-to-current converter circuit 10, an N-channel MOS transistor Md that functions as a switching element, a fixed current source Ioff (a fixed current value thereof is also taken to be Ioff), a capacitor Cd, and an inverter Inv (a threshold value thereof is taken to be Vth) that functions as a threshold value element. The circuit is such that the input voltage Vin and output voltage Vout (or values thereof detected by the voltage divider circuit or the like) of the step-up switching power supply are input to the voltage-to-current converter circuit 10, a gm (Vout-Vin) current is output (expelled) when Vout>Vin, and nothing is output when Vout≤Vin. Reference sign gm is a constant that forms a conversion coefficient of a voltage-to-current conversion.

The capacitor Cd when the N-channel MOS transistor Md is in an off-state is charged by a current of Ioff+gm (Vout-Vin) when Vout>Vin, and charged by the current of Ioff when Vout≤Vin. That is, as Vout>Vin when the step-up switching power supply is in a steady state, the capacitor Cd is charged by the current of Ioff+gm (Vout-Vin), and when Vout≤Vin, such as when starting up, the capacitor Cd is charged by the current of Ioff.

An operation of the delay circuit Fdly is as follows. On a signal in, which is an input signal of the delay circuit Fdly, changing to an H level, the N-channel MOS transistor Md is turned on (continuous), the charge of the capacitor Cd is released, a voltage Vd of the capacitor Cd reaches zero, and the output of the inverter Inv, which is an output signal of the delay circuit Fdly, changes to an H level. As the discharging of the capacitor Cd is carried out practically instantaneously, the delay of the delay circuit Fdly when transmitting the H level is practically zero.

Next, on the input signal in changing to an L level, the N-channel MOS transistor Md is turned off, the capacitor Cd is charged by the current of Ioff+gm (Vout-Vin) or Ioff, and the voltage Vd rises. Then, on the voltage Vd reaching the threshold value Vth of the inverter Inv, the output of the inverter Inv changes to an L level. That is, the delay of the delay circuit Fdly when transmitting the L level is the time needed for the capacitor Cd to reach Vth from zero (=Vth/(Ioff+gm (Vout-Vin)). In this case, when Vout>Vin, the greater the value of (Vout-Vin), the shorter the delay time. Also, when Vout≤Vin, the delay time (=Vth/Ioff) is of the maximum length determined by Ioff.

According to the heretofore described operation, the delay circuit Fdly can provide a delay time near a time $ILlim\times L/(Vin-Vout)$ needed until the current that has reached ILlim reaches zero.

What is claimed is:

1. A step-up switching power supply for being connected to an input power source, comprising:
   an inductor having a first end connected to a high potential side of the input power source;
   a switching element connected between a second end of the inductor and a low potential side of the input power source;
   a rectifying element connected to said second end;
   an output terminal connected via the rectifying element to said second end;
   an output voltage detector circuit that detects a voltage level of the output terminal and outputs a voltage detector voltage indicative of the detected voltage level;
   a current detector circuit that detects a level of a current flowing through the switching element and outputs a detected current value indicative of the detected current level; and
   circuit elements receiving a reference current signal, a first reference voltage, a second reference voltage, the voltage detector voltage and the detected current value, wherein the second reference voltage has a voltage level higher than a voltage level of the first reference voltage,
   wherein the circuit elements control the switching element to be in an off-state in response to
      the voltage detector voltage increasing to a level equal to the second reference voltage level, or
      the detected current value increasing to be equal to a value of the reference current signal,
   further wherein the circuit elements control the switching element to be in an on-state in response to the voltage detector voltage level decreasing to be equal to the first reference voltage level,
   wherein the circuit elements control the switching element to be in the on-state only when an additional condition is met, the additional condition being that the detected current value decreases to be less than the value of the reference current signal.

2. The step-up switching power supply according to claim 1, wherein while the switching element is in the off-state because the detected current value increased to the value of the reference current signal, the circuit elements control the switching element to turn into the on-state in response to the detected current value decreasing to become less than the value of the reference current signal, and the circuit elements further control the switching element so that the switching element is delayed from turning to the on-state from the off-state and continues in the off-state for a predetermined time.

3. A step-up switching power supply for being connected to an input power source, comprising:
   an inductor having a first end connected to a high potential side of the input power source;
   a switching element connected between a second end of the inductor and a low potential side of the input power source;
   a rectifying element connected to said second end;

an output terminal connected via the rectifying element to said second end;
an output voltage detector circuit that detects a voltage level of the output terminal and outputs a voltage detector voltage indicative of the detected voltage level;
a current detector circuit that detects a level of a current flowing through the switching element and outputs a detected current value indicative of the detected current level; and
circuit elements receiving a reference current signal, a first reference voltage, a second reference voltage, the voltage detector voltage and the detected current value, wherein the second reference voltage has a voltage level higher than a voltage level of the first reference voltage,
wherein the circuit elements control the switching element to be in an off-state in response to
the voltage detector voltage increasing to a level equal to the second reference voltage level, or
the detected current value increasing to be equal to a value of the reference current signal,
further wherein the circuit elements control the switching element to be in an on-state in response to the voltage detector voltage level decreasing to be equal to the first reference voltage level,
wherein while the switching element is in the off-state because the detected current value increased to the value of the reference current signal, the circuit elements control the switching element to turn into the on-state in response to the detected current value changing to become less than the value of the reference current signal, and the circuit elements further control the switching element so that the switching element is delayed from turning to the on-state from the off-state and continues in the off-state for a predetermined time,
wherein the predetermined time varies in accordance with a difference between the voltages of the high potential side of the input power source and the output terminal.

4. The step-up switching power supply according to claim 1, wherein
the current detector circuit includes a resistor or a transformer, and
the current detector circuit converts the current flowing through the switching element to a first voltage signal using the resistor or transformer,
the first voltage signal is the detected current value, and
the reference current signal is a voltage signal corresponding to a reference current.

5. The step-up switching power supply according to claim 1, wherein
the circuit elements include a hysteresis comparator, and
a comparison of the voltage detector voltage level to both the first reference voltage level and the second reference voltage level is carried out by the hysteresis comparator so as to determine whether to control the switching element to be in the on-state or the off-state.

6. A step-up switching power supply for being connected to an input power source, comprising:
an inductor having a first end connected to a high potential side of the input power source;
a switching element connected between a second end of the inductor and a low potential side of the input power source;
a rectifying element connected to said second end;
an output terminal connected via the rectifying element to said second end;
an output voltage detector circuit that detects a voltage level of the output terminal and outputs a voltage detector voltage indicative of the detected voltage level;
a current detector circuit that detects a level of a current flowing through the switching element and outputs a detected current value indicative of the detected current level; and
circuit elements receiving a reference current signal, a first reference voltage, a second reference voltage, the voltage detector voltage and the detected current value, wherein the second reference voltage has a voltage level higher than a voltage level of the first reference voltage,
wherein the circuit elements control the switching element to be in an off-state in response to
the voltage detector voltage increasing to a level equal to the second reference voltage level, or
the detected current value increasing to be equal to a value of the reference current signal,
further wherein the circuit elements control the switching element to be in an on-state in response to the voltage detector voltage level decreasing to be equal to the first reference voltage level,
further wherein the circuit elements comprise:
a comparator for receiving the reference current signal and the detected current value and comparing the value of the reference current signal and the detected current value to determine a compared output;
a delay circuit for receiving the compared output and outputting a delayed output based upon the compared output;
a hysteresis comparator receiving the voltage detector voltage, the first reference voltage and the second reference voltage and comparing the voltage detector voltage level, the first reference voltage level and the second reference voltage level to determine a hysteresis output; and
a NOR gate receiving both the hysteresis output and the delayed output, the NOR gate outputting a control signal to the switching element so as to control the switching element to be in the on-state or the off-state based upon the hysteresis output and the delayed output.

7. The step-up switching power supply according to claim 6, further comprising an amplifier that receives the control signal, amplifies the control signal and transmits the amplified control signal to the switching element.

8. The step-up switching power supply according to claim 6, wherein the comparator outputs a high signal as the compared output when the detected current value is greater than or equal to the value of the reference current signal and outputs a low signal as the compared output when the detected current value is less than the value of the reference current signal.

9. The step-up switching power supply according to claim 8, wherein the hysteresis comparator outputs as the hysteresis output
a high signal when the voltage detector voltage level is greater than or equal to the second reference voltage level, and
a low signal when the voltage detector voltage level is less than or equal to the first reference voltage level.

10. The step-up switching power supply according to claim 9, wherein the delay circuit is configured to delay changing the delayed output from a high signal to a low signal by a predetermined amount of time greater than zero when the compared output changes from the high signal to the low signal.

11. The step-up switching power supply according to claim 10, wherein the delay circuit is configured to change the delayed output from the low signal to the high signal without any delay when the compared output changes from the low signal to the high signal.

12. The step-up switching power supply according to claim 1, further comprising an output capacitor connecting the output terminal to ground.

13. The step-up switching power supply according to claim 6, wherein the circuit elements control the switching element to be in the on-state only when an additional condition is met, the additional condition being that the detected current value decreases to be less than the value of the reference current signal.

\* \* \* \* \*